(12) United States Patent
Zarzycki et al.

(10) Patent No.: US 8,296,776 B2
(45) Date of Patent: Oct. 23, 2012

(54) EFFICIENT MECHANISM FOR TERMINATING APPLICATIONS

(75) Inventors: David Alexander Zarzycki, New York, NY (US); Curtis Rothert, Morgan Hill, CA (US); Ali Ozer, Redwood City, CA (US); Mark Andrew Piccirelli, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1160 days.

(21) Appl. No.: 12/143,466

(22) Filed: Jun. 20, 2008

(65) Prior Publication Data

US 2009/0307710 A1    Dec. 10, 2009

Related U.S. Application Data

(60) Provisional application No. 61/059,469, filed on Jun. 6, 2008.

(51) Int. Cl.
  G06F 3/00    (2006.01)
  G06F 9/44    (2006.01)
  G06F 9/46    (2006.01)
  G06F 13/00   (2006.01)

(52) U.S. Cl. .................................................... 719/312
(58) Field of Classification Search .................. 719/312
  See application file for complete search history.

(56) References Cited

U.S. PATENT DOCUMENTS

| | | | |
|---|---|---|---|
| 5,781,770 A | 7/1998 | Byers et al. | |
| 6,848,102 B2 * | 1/2005 | Nakahara et al. | 718/104 |
| 7,533,277 B2 | 5/2009 | Bernstein et al. | |
| 7,565,581 B1 * | 7/2009 | Halligan et al. | 714/51 |
| 7,716,461 B2 * | 5/2010 | Downer et al. | 713/1 |
| 7,788,474 B2 | 8/2010 | Switzer et al. | |
| 8,006,246 B2 * | 8/2011 | Kwon | 718/102 |
| 2002/0113777 A1 | 8/2002 | Lauderdale | |
| 2007/0240157 A1 | 10/2007 | Herenyi et al. | |

* cited by examiner

*Primary Examiner* — Emerson Puente
*Assistant Examiner* — Kimbleann Verdi
(74) *Attorney, Agent, or Firm* — Blakely, Sokoloff, Taylor & Zafman LLP (57) ABSTRACT

An efficient mechanism for terminating applications of a data processing system is described herein. In one embodiment, in response to a request for exiting from an operating environment of a data processing system, an operating system examines an operating state associated with an application running within the operating environment, where the operating state is stored at a predetermined memory location shared between the operating system and the application. The operating system immediately terminates the application if the operating state associated with the application indicates that the application is safe for a sudden termination. Otherwise, the operating system defers terminating the application if the operating state associated with the application indicates that the application is unsafe for the sudden termination.

18 Claims, 7 Drawing Sheets

```xml
<?xml version="1.0" encoding="UTF-8"?>
<!DOCTYPE plist PUBLIC "-//Apple//DTD PLIST 1.0//EN" "http://www.apple.com/DTDs/PropertyList-1.0.dtd">
<plist version="1.0">
<dict>
<key>CFBundleDevelopmentRegion</key>
<string>English</string>
<key>CFBundleExecutable</key>
<string>Calculator</string>
<key>CFBundleGetInfoString</key>
<string>4.2, Copyright © 2000-2007 Apple Inc.</string>
<key>CFBundleHelpBookFolder</key>
<string>CalculatorHelp</string>
<key>CFBundleHelpBookName</key>
<string>Calculator Help</string>
<key>CFBundleIconFile</key>
<string>Calculator.icns</string>
<key>CFBundleIdentifier</key>
<string>com.apple.calculator</string>
<key>CFBundleInfoDictionaryVersion</key>
<string>6.0</string>
<key>CFBundleName</key>
<string>Calculator</string>
<key>CFBundlePackageType</key>
<string>APPL</string>
<key>CFBundleShortVersionString</key>
<string>4.5</string>
<key>CFBundleSignature</key>
<string>????</string>
<key>CFBundleVersion</key>
<string>85</string>
<key>LSHasLocalizedDisplayName</key>
<true/>
<key>LSMinimumSystemVersion</key>
<string>10.3</string>
<key>NSMainNibFile</key>
<string>Calculator</string>
<key>NSPrincipalClass</key>
<string>NSApplication</string>
<key>NSSupportsSuddenTermination</key>      211
<true/>
</dict>
</plist>
```

EFFICIENT MECHANISM FOR TERMINATING APPLICATIONS

RELATED APPLICATIONS

This application claims benefit of U.S. Provisional Application No. 61/059,469, filed Jun. 6, 2008, which is hereby incorporated by reference.

FIELD OF THE INVENTION

The present invention relates generally to operations of a data processing system. More particularly, this invention relates to efficient shutdown mechanism for a data processing system.

BACKGROUND

An operating system is a set of computer code that performs a variety of functions, including interacting with the computer hardware; insulating the programmer from the specifics of the computer hardware; and providing general functionality that many application programs require.

An application, in contrast, addresses a particular problem to be solved. Examples of applications software are word processors, etc. An application and operating system communicate using a series of standardized instruction codes passed between the two. The operating system software interprets these standardized instruction codes, and controls the computer's hardware resources in response thereto. Oftentimes, information in the form of data or messages is passed back to the applications software.

Typically, when a user instructs the operating system to shut down the computer in which applications and operating system are running, it takes a relatively long time to shut down. For example, the operating system may ask an application to exit itself which may take a long time. Alternatively, the operating system may prompt the user to manually terminate the application, which sometimes requires too much user interaction.

SUMMARY OF THE DESCRIPTION

An efficient mechanism for terminating applications of a data processing system is described herein. According to certain embodiments, for each application that is running in a data processing system, there is an operating state associated with each application and stored in a predetermined memory location shared and accessible between the respective application and the operating system supporting the application. For example, whenever an application enters a critical section (e.g., containing unflushed or unsaved data), the application updates the operating state to indicate that the application is unsafe to exit. When the application leaves the critical section (e.g., data has been flushed), the application updates its operating state in the shared memory to indicate that the application is safe to exit.

As a result, when an operating system receives a request to shut down, for each application, the operating system examines the operating state associated with each application to determine whether the operating system can terminate the application and/or shut down the data processing system immediately. If the operating state of an application indicates that the respective application is unsafe to exit, the operating system may defer terminating the application and/or shutting down the data processing system until the application has a chance to finish up whatever it needs to do. On the other hand, if the operating state of an application indicates that the application is safe to exit, the operating system may immediately terminate the application and shut down the data processing system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3 is pseudo code representing an example of application metadata according to one embodiment of the invention.

DETAILED DESCRIPTION

An efficient mechanism for terminating applications of a data processing system is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments, for each application that is running in a data processing system, there is an operating state associated with each application and stored in a predetermined memory location shared and accessible between the respective application and the operating system supporting the application. For example, whenever an application enters a critical section (e.g., containing unflushed or unsaved data), the application updates the operating state to indicate that the application is unsafe to exit. When the application leaves the critical section (e.g., data has been flushed), the application updates its operating state in the shared memory to indicate that the application is safe to exit.

As a result, when an operating system receives a request to shut down, for each application, the operating system examines the operating state associated with each application to determine whether the operating system can terminate the application and/or shut down the data processing system immediately. If the operating state of an application indicates that the respective application is unsafe to exit, the operating system may defer terminating the application and/or shutting down the data processing system until the application has a chance to finish up whatever it needs to do. On the other hand, if the operating state of an application indicates that the application is safe to exit, the operating system may immediately terminate the application and shut down the data processing system.

Figure 1:
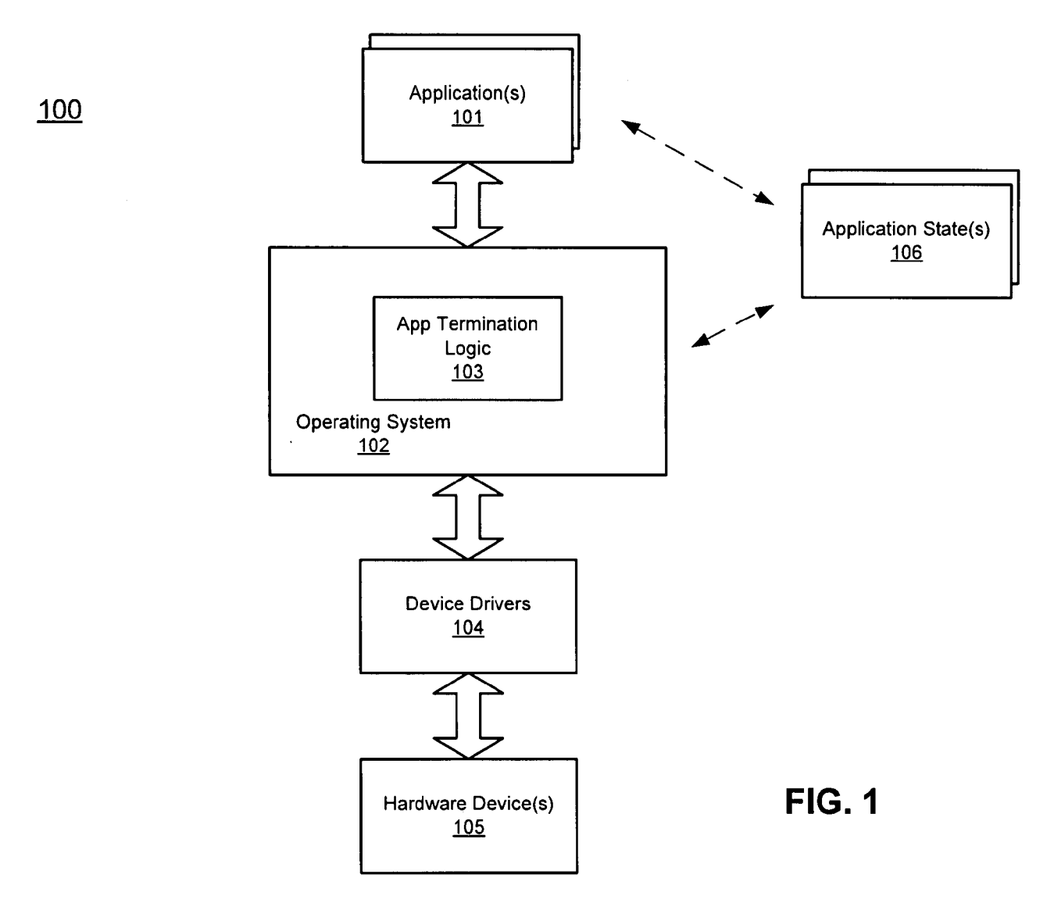
FIG. 1 is a block diagram illustrating an example of software architecture which may be used with an embodiment of the invention.

FIG. 1 is a block diagram illustrating an example of software architecture which may be used with an embodiment of the invention. Referring to FIG. 1, according to one embodiment, system 100 includes, but is not limited to, one or more applications 101 communicatively coupled to an operating system 102, where the operating system 102 is configured to communicate with one or more device drivers 104 to control operations of one or more hardware devices 105. Applications 101 can be any of a variety of applications, such as, for example, word processing application software, etc.

Similarly, operating system 102 can be any of a variety of operating systems, such as, for example, Mac OS from Apple, Inc. of Cupertino, Calif. or alternatively, Windows operating system from Microsoft Corporation of Redmond, Wash. Other operating systems such as UNIX or Linux may also be applied.

Operating system 102 is the software component of a data processing system that is responsible for the management and coordination of activities and the sharing of the resources of the computer. The operating system (OS) acts as a host for application programs (e.g., applications 101) that are run on the machine. As a host, one of the purposes of an operating system is to handle the details of the operation of the hardware (e.g., hardware 105 via device drivers 104). This relieves application programs from having to manage these details and makes it easier to write applications. Almost all computers, including hand-held computers, desktop computers, supercomputers, and even modern video game consoles, use an operating system of some type.

Operating systems offer a number of services to application programs and users. Applications access these services through application programming interfaces (APIs) or system calls. By invoking these interfaces, the application can request a service from the operating system, pass parameters, and receive the results of the operation. Users may also interact with the operating system by typing commands or using a graphical user interface (GUI). For hand-held and desktop computers, the GUI is generally considered part of the operating system. For large multiuser systems, the GUI is generally implemented as an application program that runs outside the operating system.

Device driver 104 is a specific type of computer software developed to allow interaction with hardware device 105. Typically this constitutes an interface for communicating with device 105, through the specific computer bus or communications subsystem that the hardware is connected to, providing commands to and/or receiving data from the device, and on the other end, the requisite interfaces to the operating system and software applications. It is a specialized hardware-dependent computer program which is also operating system specific that enables another program, typically operating system 102 or applications software package or computer program running under the operating system kernel, to interact transparently with a hardware device, and usually provides the requisite interrupt handling necessary for any necessary asynchronous time-dependent hardware interfacing needs.

Operating system 102 is also responsible for launching and/or terminating each of the applications 101, in response to a user interaction, such as, for example, log out or shutdown action. According to one embodiment, operating system 102 includes an application termination logic 103 that is configured to terminate each of the applications 101. In addition, according to one embodiment, for each application running within system 100, an application state 106 associated with each application is maintained in a predetermined memory location shared and accessible by application 101 and operating system 102. In a particular embodiment, the application state 106 is accessible by application 101 or operating system 102 with an atomic lock such that only one of the application 101 and operating system 102 can access the application state 106 at a given time.

For example, whenever application 101 enters a critical section (e.g., containing unflushed or unsaved data), the application 101 updates the operating state 106 to indicate that the application 101 is unsafe to exit or be terminated. When application 101 leaves the critical section (e.g., data has been flushed), application 101 updates operating state 106 in the shared memory to indicate that application 101 is now safe to exit.

As a result, when operating system 102 receives a request to shut down or logout, for each application, the operating system 102 examines the operating state 106 associated with each application to determine whether the operating system 102 can terminate the application and/or shut down or log out the data processing system immediately. If the operating state 106 of an application indicates that the respective application is unsafe to exit, the operating system 102 may defer terminating the application and/or shutting down/log out the data processing system until the application has a chance to finish up whatever it needs to do. On the other hand, if the operating state 106 of an application indicates that the application is safe to exit, the operating system 102 may immediately terminate the application and shut down/log out the data processing system.

Figure 2:
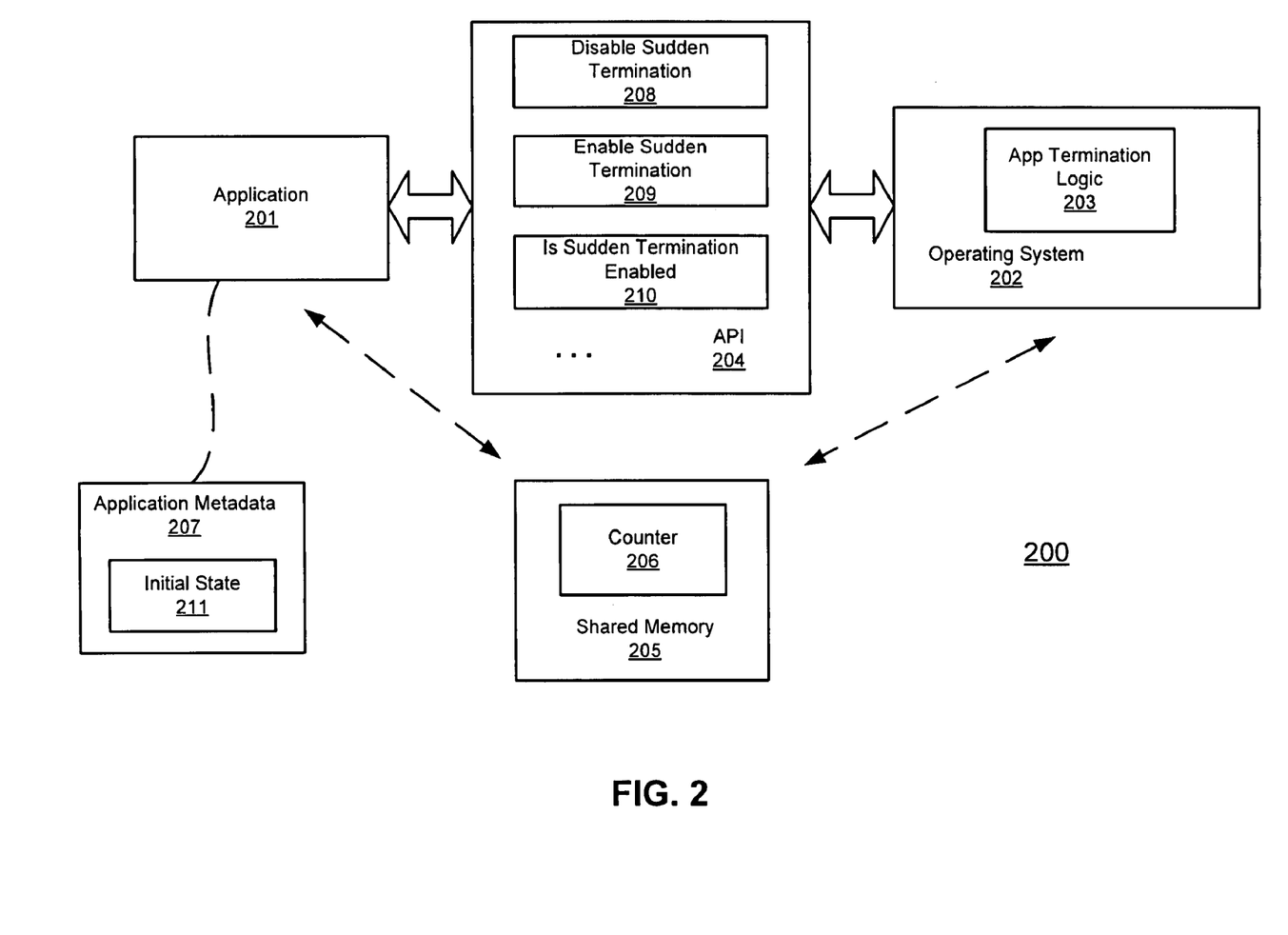
FIG. 2 is a block diagram illustrating an example of an application termination mechanism according to one embodiment of the invention.

FIG. 2 is a block diagram illustrating an example of an application termination mechanism according to one embodiment of the invention. System 200 may be implemented as part of system 100 of FIG. 1. For example, application 201 and operating system 202 may be implemented as part of application 101 and operating system 102 of FIG. 1 respectively. Referring to FIG. 2, similar to system 100 of FIG. 1, application 201 is communicatively coupled to operating system 202 via a set of APIs 204. In one embodiment, API 204 is designed for application 201 and operating system 202 to communicate with each other regarding whether it is safe for operating system 202 to terminate application 201 immediately without delay, also referred to as sudden termination throughout this application.

In addition, as described above, for each application, in this example, application 201, an operating state associated with each application is maintained by system 200 to indicate whether the associated application is safe for sudden termination. The operating state of an application can be maintained using a variety of manners. In one embodiment, a counter 206 is maintained for each application, in this example application 201, and stored in a predetermined memory location of memory 205 shared and accessible by application 201 and operating system 202.

A specific value or a range of values of counter 201 can be used to indicate whether application 201 can be safely terminated by operating system 202. In one embodiment, when a value of counter 206 is less than zero, application 201 can be terminated immediately. When a value of counter 206 is greater than or equals to zero, application 201 is not safe to be terminated immediately by application termination logic 203 of operating system 202. Alternatively, a value of less than or equaled to zero may be used to indicate that application 201 is safe to be terminated and a value of greater than zero may be used to indicate that application 201 is not safe to be terminated, dependent upon a specific configuration.

According to one embodiment, whenever an application enters a critical section, the application increments the value of its associated counter to indicate that the application is unsafe to be sudden terminated. Whenever an application exits a critical section, the application decrements the value of its associated counter to reduce a possibility of unsafe sudden termination. For example, when a user edits content of a word document of a word processing software application, the word processing software application increments the associated counter to indicate that the word processing software application is unsafe for sudden termination. When a user saves the unsaved edits into a file, the word processing software application decrements the value of the associated counter.

Note that an application may have multiple threads concurrently running and may enter a critical section concurrently. As a result, each thread may individually increment the value of the counter associated with the application. For example, the word processing software application may have multiple documents simultaneously opened and edited by a user. Thus, each instant of the word processing software application may increment the value of the counter associated with the word processing software application. Therefore, the word processing software application is unsafe for sudden termination until all instants (e.g., all threads) have exited the critical sections and decremented the value of the associated counter.

In this example, referring to FIG. 2, when application 201 enters a critical section, application 201 increments the value of counter 206 to indicate that application 201 is not safe for sudden termination. When application 201 exits a critical section, application 201 decrements the value of counter 206 to reduce the possibility of unsafe sudden termination. Meanwhile, when operating system 202 receives a request to shut down or log out from a current operating environment or desktop, operating system 202 also access the counter 206 to determine whether application 201 can be suddenly terminated.

For example, whenever operating system 202 receives such a request, operating system 202 decrements the value of counter 206 and then operating system 202 evaluates the value of counter 206 for determination of sudden termination. If the value of counter 206 is less than zero after the decrement, operating system 202 may terminate application 201 immediately without deferral or delay. However, if the value of counter 206 is greater than or equals to zero, operating system 202 would not terminate application 201 immediately. Rather, operating system 202 may request application 201 to exit itself, which defers or delays the shutdown or logout process.

According to one embodiment, API 204 is used for application 201 and operating system 202 to communicate with each other. For example, API 204 includes, but is not limited to, function 208 to disable sudden termination, function 209 to enable sudden termination, and a query function 210 to allow operating system 202 to query application 201 whether application 201 is safe for sudden termination. For example, when application 201 needs to increment the value of counter 206, application 201 invokes function 208 which in turn increments the value of counter 206 and in effect disables the sudden termination for application 201. When application 201 needs to decrement the value of counter 206, application 201 invokes function 209 which in turn decrements the value of counter 206 and in effect enables the possibility (dependent upon how many threads or instants) of the sudden termination for application 201. In addition, query function 210 may be used by operating system 202 to dynamically query application 201 to determine whether application 201 is safe for sudden termination.

According to one embodiment, an initial value of counter 206 may be configured by default as one when application 201 is launched. After application 201 is launched and initialized, if application 201 is not in a critical section, application 201 may decrement the value of counter 206 which is reduced to zero. Thus, when operating system 202 receives a request to shut down or log out, operating system 202 decrements the value of counter 206 and then examines the value of counter 206. In this example, the value of counter 206 would have been a negative value which indicates that application 201 is safe to be sudden terminated. As a result, operating system 202 may terminate application 201 immediately.

According to another embodiment, the initial value of counter 206 may be preconfigured via an initial operating state 211 of application metadata 207 associated with application 201. When the initial operating state is set to a predetermined value which indicates that application 201 supports sudden termination, counter 206 is initialized as zero when application 201 is loaded by operating system 202. Since the initial value of counter 206 is zero, operating system 202 assumes that application 201 is safe for sudden termination. Otherwise, the initial value of counter 206 is set to one which is assumed that application 201 is unsafe for sudden termination. An example of application metadata file 207 is shown in FIG. 3.

This setting avoids the situation in which when application 201 is being loaded with an initial value of counter 206 as one, and application 201 hangs during the initialization. Thus, application 201 never gets a chance to decrement the value of counter 206 even though application 201 is not in a critical section. As a result, when operating system 202 receives a request for shutdown or logout, operating system 202 would not suddenly terminate application 201 since the value of counter 206 is not zero and the shutdown or logout process will be further delayed.

Note that counter 206 is an atomic (e.g., via a locking mechanism which may be implemented as hardware, software, or a combination of both) counter in which only one of application 201 and operating system 202 can access counter 206 at a given time.

Figure 4:
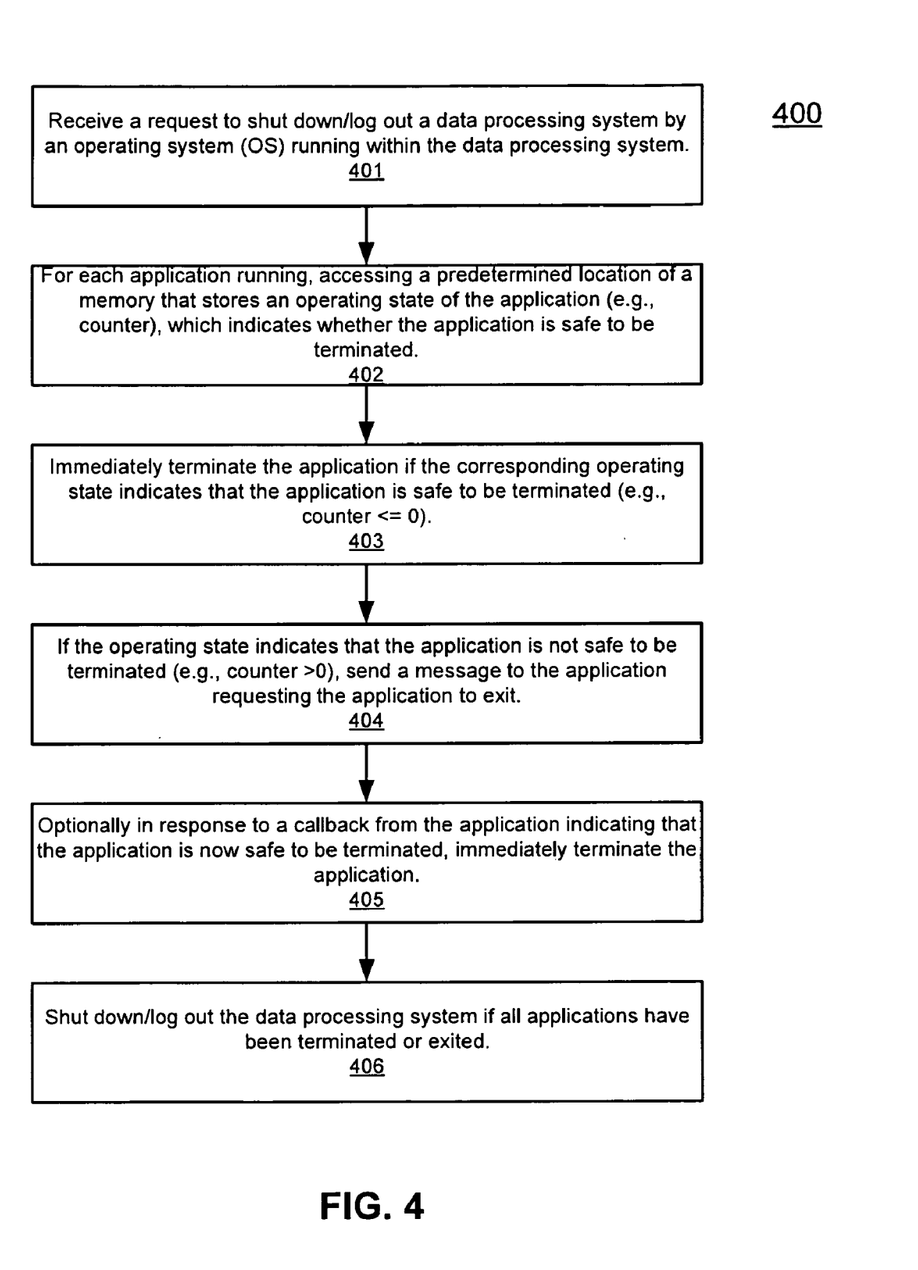
FIG. 4 is a flow diagram illustrating a process for efficiently terminating applications according to one embodiment of the invention.

FIG. 4 is a flow diagram illustrating a process for efficiently terminating applications according to one embodiment of the invention. Note that process 400 may be performed by processing logic which includes software, hardware, or a combination of both. For example, process 400 may be performed by system 200 of FIG. 2. Referring to FIG. 4, at block 401, a request for shutdown or logout is received by an operating system of a data processing system. At block 402, for each of applications running, the operating system accesses a predetermined memory location that stores an operating state of the application which indicates whether the application is safe for sudden termination. If the operating state indicates that the application is safe for sudden termination (e.g., counter<=0), at block 403, the operating system can immediately terminate the application. Otherwise, at block 404, the operating system asks the application to exit itself. Alternatively, operating system may dynamically query the application and upon receiving a callback, at block 405, the operating system immediately terminates the application. Once all applications have been terminated, at block 406, the operating system can then shut down or log out the data processing system.

Figure 5:
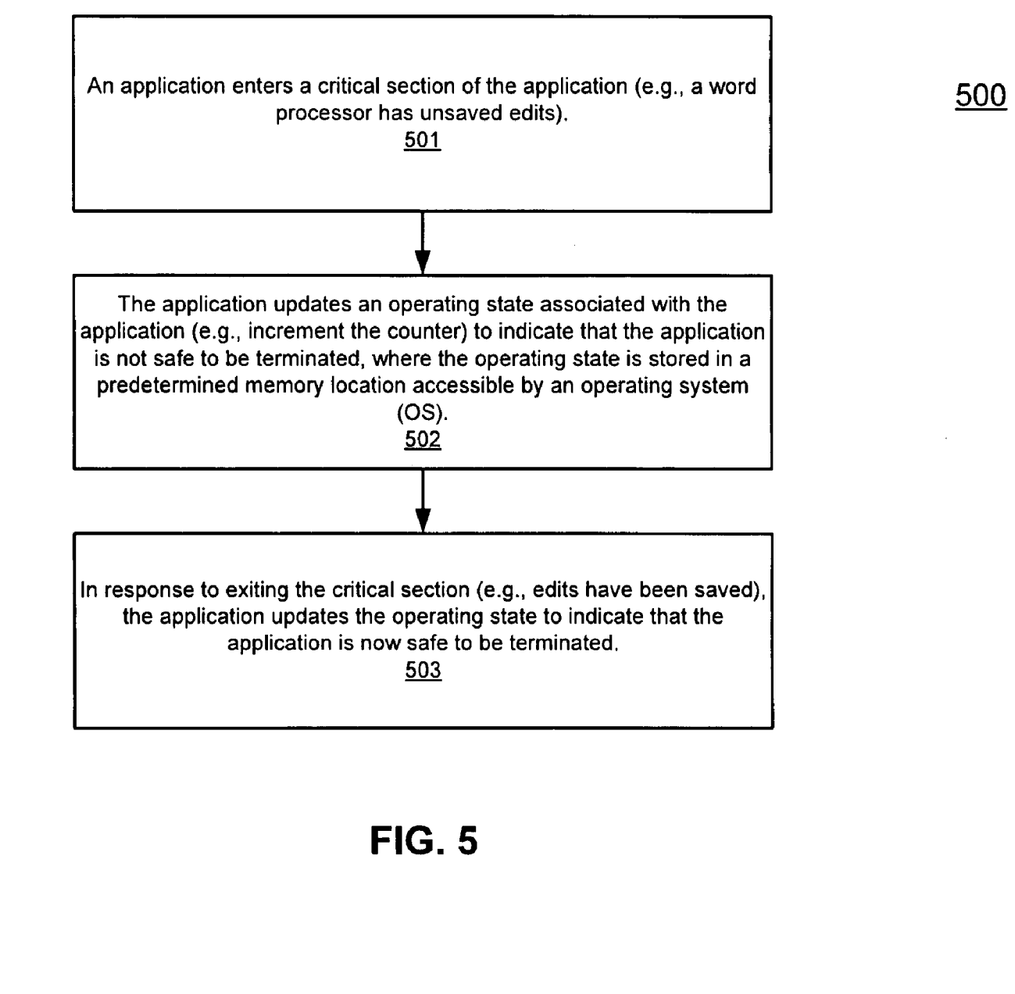
FIG. 5 is a flow diagram illustrating a process for efficiently terminating applications according to another embodiment of the invention.

FIG. 5 is a flow diagram illustrating a process for efficiently terminating applications according to another embodiment of the invention. Note that process 500 may be performed by processing logic which includes software, hardware, or a combination of both. For example, process 500 may be performed by system 200 of FIG. 2. Referring to FIG. 5, at block 501, an application enters a critical section (e.g., word processor has unsaved edits). At block 502, the application updates the associated operating state stored in a predetermined memory location shared between the application and the operating system, for example, by incrementing a value of a counter corresponding to the application, to indicate that the application is unsafe for sudden termination. When the application exits the critical section, at block 503, the application updates the associated operating state, for example, by decrementing a value of a counter corresponding to the application, to increase the possibility of sudden termination.

Figure 6:
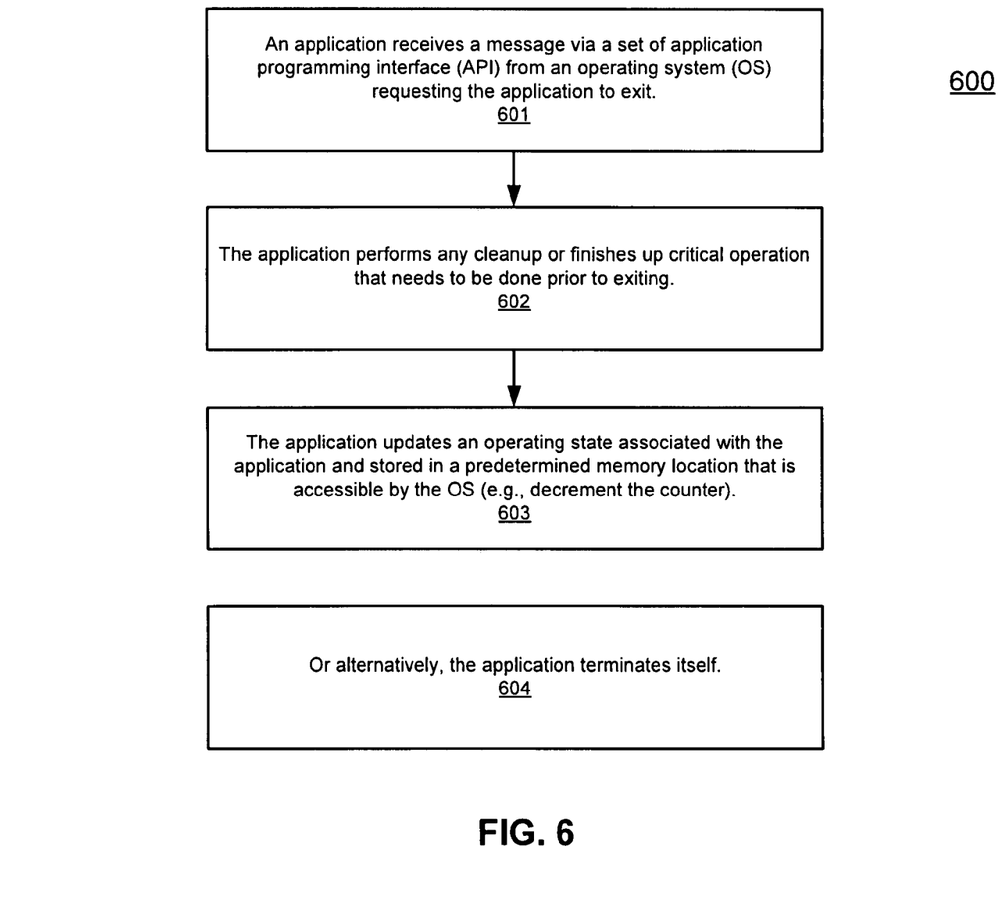
FIG. 6 is a flow diagram illustrating a process for efficiently terminating applications according to another embodiment of the invention.

FIG. 6 is a flow diagram illustrating a process for efficiently terminating applications according to another embodiment of the invention. Note that process 600 may be performed by processing logic which includes software, hardware, or a combination of both. For example, process 600 may be performed by system 200 of FIG. 2. Referring to FIG. 6, at block 601, an application receives a message from an operating system requesting to exit. In this example, it is assumed that the operating system already examined the operating state of the application which indicates that the application is unsafe for sudden termination. In response, at block 602, the application performs any cleanup or finishes up the critical operations (e.g., saving unsaved data) that need to be done prior to exiting. At block 603, the application updates the associated operating state stored in a predetermined memory location shared between the application and the operating system (e.g., decrementing a value of the associated counter) or alternatively, at block 604, the application terminates itself.

Figure 7:
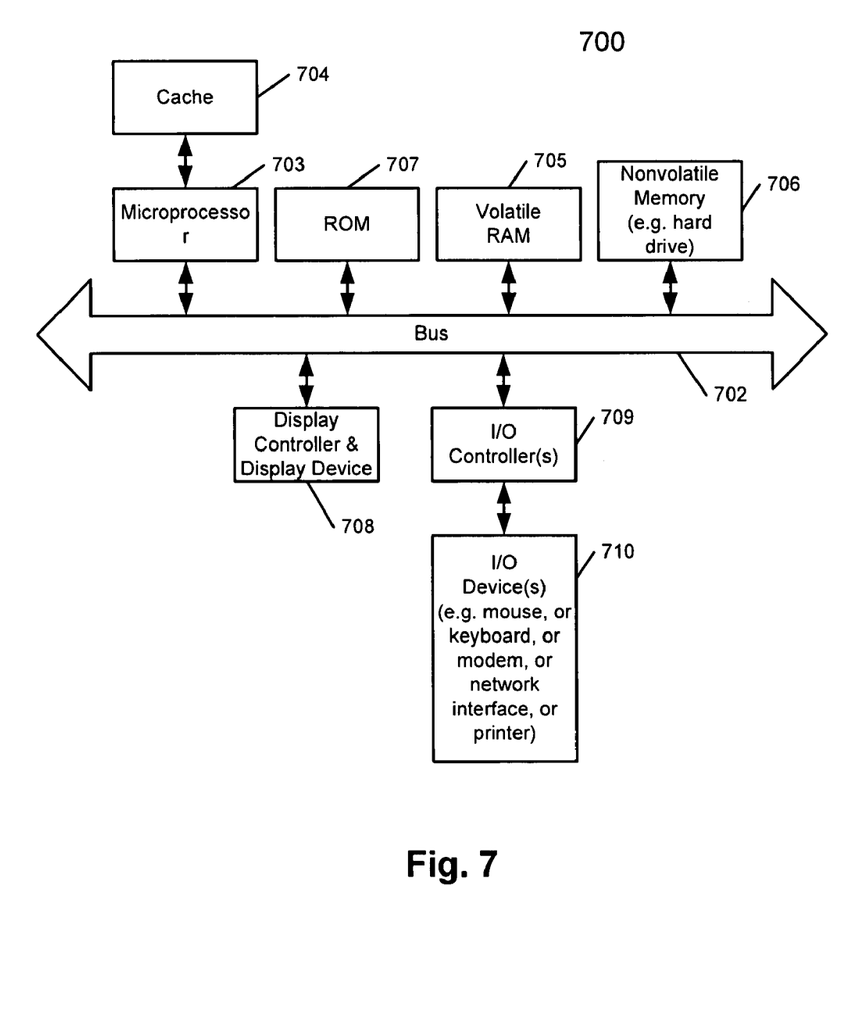
FIG. 7 is a block diagram of a data processing system, which may be used with one embodiment of the invention.

FIG. 7 is a block diagram of a data processing system, which may be used with one embodiment of the invention. For example, the system 700 shown in FIG. 7 may be used as systems 100 and/or 200 of FIGS. 1-2. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple Macintosh computer or MacBook, or an IBM compatible PC.

As shown in FIG. 7, the computer system 700, which is a form of a data processing system, includes a bus or interconnect 702 which is coupled to one or more microprocessors 703 and a ROM 707, a volatile RAM 705, and a non-volatile memory 706. The microprocessor 703 is coupled to cache memory 704. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art.

Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Thus, an efficient mechanism for terminating applications of a data processing system has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method comprising:
in response to a request for exiting from an operating environment of a data processing system, an operating system examining an operating state associated with an application running within the operating environment, the operating state being stored at a predetermined memory location shared between the operating system and the application, wherein the operating state is written to and updated in the predetermined memory location by the application;
wherein when the application enters a critical section, the application updates the operating state stored at the predetermined memory location to indicate that the application is unsafe for sudden termination, and wherein when the application exits from the critical section, the application updates the operating state stored at the predetermined memory location to indicate that the application is safe for sudden termination;
the operating system immediately terminating the application if the operating state associated with the application indicates that the application is safe for a sudden termination; and
the operating system deferring terminating the application if the operating state associated with the application indicates that the application is unsafe for the sudden termination.

2. The method of claim 1, wherein the request for exiting from the operating environment is one of a request for shutting down the data processing system and a request for logging out from a desktop environment of the data processing system.

3. The method of claim 1, wherein the predetermined memory location is only accessible by one of the application and the operating system at a given time.

4. The method of claim 1, further comprising maintaining the operating state of the application using a counter stored in the predetermined memory location, wherein a predetermined value or a predetermined range of values of the counter is used to indicate whether the application is safe for sudden termination.

5. The method of claim 4, wherein when the application enters the critical section, the application increments a value of the counter to indicate that the application is unsafe for sudden termination, and wherein when the application exits from the critical section, the application decrements the value of the counter to indicate that the application is safe for sudden termination.

6. The method of claim 5, further comprising, in response to the request for exiting the operating environment of the data processing system, the operating system decrementing the value of the counter, wherein if the value of the counter is less than zero, the application is safe for sudden termination, and wherein if the value of the counter is greater than or equal to zero, the application is unsafe for sudden termination.

7. The method of claim 6, further comprising, if the application is unsafe for sudden termination, the operating system requesting via an application programming interface (API) the application to exit itself.

8. The method of claim 6, further comprising setting an initial value for the counter when the application is launched based on a configuration of a metadata file associated with the application.

9. The method of claim 8, wherein the counter is initialized as zero if the configuration of the metadata file is set to a first predetermined value, and wherein the counter is initialized as one if the configuration of the metadata file is set to a second predetermined value.

10. A non-transitory machine-readable medium having instructions stored therein, which when executed by a machine, cause the machine to perform a method, the method comprising:
in response to a request for exiting from an operating environment of a data processing system, an operating system examining an operating state associated with an application running within the operating environment, the operating state being stored at a predetermined memory location shared between the operating system and the application, wherein the operating state is written to and updated in the predetermined memory location by the application;
wherein when the application enters a critical section, the application updates the operating state stored at the predetermined memory location to indicate that the application is unsafe for sudden termination, and wherein when the application exits from the critical section, the application updates the operating state stored at the predetermined memory location to indicate that the application is safe for sudden termination;
the operating system immediately terminating the application if the operating state associated with the application indicates that the application is safe for a sudden termination; and
the operating system deferring terminating the application if the operating state associated with the application indicates that the application is unsafe for the sudden termination.

11. The non-transitory machine-readable medium of claim 10, wherein the request for exiting from the operating environment is one of a request for shutting down the data processing system and a request for logging out from a desktop environment of the data processing system.

12. The non-transitory machine-readable medium of claim 10, wherein the predetermined memory location is only accessible by one of the application and the operating system at a given time.

13. The non-transitory machine-readable medium of claim 10, wherein the method further comprises maintaining the operating state of the application using a counter stored in the predetermined memory location, wherein a predetermined value or a predetermined range of values of the counter is used to indicate whether the application is safe for sudden termination.

14. The non-transitory machine-readable medium of claim 13, wherein when the application enters the critical section, the application increments a value of the counter to indicate that the application is unsafe for sudden termination, and wherein when the application exits from the critical section, the application decrements the value of the counter to indicate that the application is safe for sudden termination.

15. The non-transitory machine-readable medium of claim 14, wherein the method further comprises, in response to the request for exiting the operating environment of the data processing system, the operating system decrementing the value of the counter, wherein if the value of the counter is less than zero, the application is safe for sudden termination, and wherein if the value of the counter is greater than or equal to zero, the application is unsafe for sudden termination.

16. The non-transitory machine-readable medium of claim 15, wherein the method further comprises, if the application is unsafe for sudden termination, the operating system requesting via an application programming interface (API) the application to exit itself.

17. The non-transitory machine-readable medium of claim 15, wherein the method further comprises setting an initial value for the counter when the application is launched based on a configuration of a metadata file associated with the application, wherein the counter is initialized as zero if the configuration of the metadata file is set to a first predetermined value, and wherein the counter is initialized as one if the configuration of the metadata file is set to a second predetermined value.

18. A data processing system, comprising:
- a processor;
- a memory;
- an operating system running within the memory and executed by the processor, the operating system having an application termination logic;
- a plurality of applications running within the memory and executed by the processor, the plurality of applications communicatively coupled to the operating system,
- wherein in response to a request for shutting down or logging out from the data processing system, the application termination logic examines an operating state associated with each of the applications and stored at a predetermined location of the memory shared between the operating system and each application, wherein the operating state is written to and updated in the predetermined memory location by the application,
- wherein when the application enters a critical section, the application updates the operating state stored at the predetermined memory location to indicate that the application is unsafe for sudden termination, and wherein when the application exits from the critical section, the application updates the operating state stored at the predetermined memory location to indicate that the application is safe for sudden termination,
- wherein the application termination logic immediately terminates an application if the operating state associated with the application indicates that the application is safe for a sudden termination, and
- wherein the application termination logic defers terminating the application if the operating state associated with the application indicates that the application is unsafe for the sudden termination.

* * * * *